(12) United States Patent
Speker

(10) Patent No.: US 8,188,403 B2
(45) Date of Patent: May 29, 2012

(54) NOZZLE FOR A LASER MACHINING DEVICE

(75) Inventor: Nicolai Speker, Pleidelsheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 981 days.

(21) Appl. No.: 12/125,384

(22) Filed: May 22, 2008

(65) Prior Publication Data

US 2008/0237207 A1    Oct. 2, 2008

Related U.S. Application Data

(63) Continuation of application No. PCT/EP2005/012625, filed on Nov. 25, 2005.

(51) Int. Cl.
B23K 26/14    (2006.01)

(52) U.S. Cl. .......... 219/121.67; 219/121.72; 219/121.84

(58) Field of Classification Search ......... 219/121.63–121.72, 121.84
See application file for complete search history.

(56) References Cited

U.S. PATENT DOCUMENTS

| | | | | |
|---|---|---|---|---|
| 3,907,408 A | * | 9/1975 | Engel | 359/859 |
| 4,121,085 A | * | 10/1978 | Diemer et al. | 219/121.84 |
| 4,774,392 A | * | 9/1988 | Orita | 219/121.63 |
| 4,913,405 A | * | 4/1990 | Van Der Have et al. | 266/48 |
| 6,118,097 A | | 9/2000 | Kaga et al. | |
| 6,423,928 B1 | | 7/2002 | Piwczyk | |
| 7,619,180 B2 | * | 11/2009 | Diem | 219/121.63 |

FOREIGN PATENT DOCUMENTS

| | | |
|---|---|---|
| JP | 62006790 | 1/1987 |
| JP | 63056389 A | 3/1988 |
| JP | 09-023957 | 1/1997 |
| JP | 2000126888 A | 5/2000 |

OTHER PUBLICATIONS

Notification of Transmittal of Translation of the International Preliminary Report on Patentability from corresponding PCT Application No. PCT/EP2005/012625, mailed Jul. 17, 2008, 6 pages.
International Search Report for corresponding PCT Application No. PCT/EP2005/012625, mailed Aug. 2, 2006, 4 pages.
Letter from Opposition against European Application No. 1 957 232 (which corresponds to the present US application), dated Oct. 10, 2011.

* cited by examiner

Primary Examiner — Samuel M Heinrich
(74) Attorney, Agent, or Firm — Fish & Richardson P.C.

(57) ABSTRACT

A laser machining nozzle having at least one supply chamber for the laser beam and for a processing gas has a cavity arranged in the region of the orifice of the gas supply chamber, which cavity is open in the direction towards the workpiece to be machined, this opening having a wedge-shaped edge.

14 Claims, 4 Drawing Sheets

NOZZLE FOR A LASER MACHINING DEVICE

CROSS REFERENCE TO RELATED APPLICATIONS

This application is a continuation of and claims priority under 35 U.S.C. §120 to PCT Application No. PCT/EP2005/012625, filed on Nov. 25, 2005 The contents of this priority application is hereby incorporated by reference in their entirety.

TECHNICAL FIELD

The invention relates to a laser machining nozzle having at least one supply chamber for the laser beam and for a processing gas.

BACKGROUND

Laser machining nozzles are disclosed, for example, in U.S. Pat. No. 6,423,928 B1.

According to the prior art, during fusion cutting (e.g. of VA steel), the orifice diameter of a laser machining nozzle in the form of a hole-type nozzle needs to be enlarged as the sheet thickness to be processed increases. For that reason, increasingly high gas pressures are needed. But increasing gas pressures mean an increasing gas density in the cutting gap, resulting in an increased probability of plasma formation. The plasma threshold is dependent inter alia also on the beamed-in power density (an increase in power density or processing temperature increases plasma) and the focal position (a higher focal position increases plasma), and represents a constraint on the quality of the fusion cut.

When cutting thick sheets, better cut edge qualities can be achieved if the cutting gas pressure is reduced. However, this is always associated with the formation of a distinct burr.

SUMMARY

The invention features a nozzle for laser beam cutting that allows high quality cuts with low cut edge roughness to be achieved. The nozzles described herein also provide good cutting efficiency, that is to say high feed rates are achieved whilst retaining the high-grade quality of the cut. Specifically when cutting thick sheets, the nozzles help to minimize or counteract plasma formation.

The laser machining nozzles described herein have a cavity arranged in the region of the orifice of the gas supply chamber, which cavity is open only in the direction towards the workpiece to be machined, the opening having a wedge-shaped edge.

The action of the laser machining nozzle is aimed at achieving a large overlap degree of the cutting front, without the orifice diameter of the laser machining nozzle having to be enlarged. At the same time, the development of a diffuser in the action, which would result in a lower momentum on the melt, is avoided.

With the aid of the wedge-shaped edge according to the invention, a swirling flow develops. Owing to the swirling flow, the main gas jet flows first of all into a volume (dynamic pressure volume), the pressure of which is elevated compared with the surroundings. Compared with known laser machining nozzles, the processing gas therefore reaches a relatively high discharge speed from the orifice, whereby an improved momentum transmission to the sheet or to the cutting front is rendered possible. Owing to the same-direction speeds in the transition region between the swirling flow and the main gas jet, frictional losses between the main gas jet and the surroundings are reduced compared with known laser machining nozzles. The swirling flow additionally has a supporting effect on the main gas jet in the area above the workpiece. A further supporting effect occurs inside the cutting gap. Compared with known laser machining nozzles, the main gas jet does not separate from the cutting front until further down. This leads to an improved cut edge.

In a preferred embodiment, the cavity is arranged rotationally symmetrically with respect to the orifice of the gas supply chamber. Through this arrangement, the processing gas jet is enveloped with a dynamic pressure volume of processing gas. This generates a rotationally symmetrical overlap of the cutting front.

When the orifice of the gas supply chamber is recessed behind the nozzle tip of the laser machining nozzle, the processing gas can be held back very well and flow into the hollow cavity.

The formation of the swirling flow is further assisted by the fact that the cavity has a rounded inner contour in the region of the cavity base.

It is also conceivable for the cavity to have an inner contour of angular construction in the region of the cavity base.

When the inner sides of the cavity are arranged transversely or run obliquely with respect to the direction of the gas supply chamber, processing gas is able to flow virtually radially into the cavity.

The extent of the cavity behind the orifice of the gas supply chamber optimizes the flow conditions.

With the aid of the discharge edge, the backward-flowing gas is able to flow as coaxially as possible with the main gas jet. This additionally improves the cutting results.

The details of one or more embodiments of the invention are set forth in the accompanying drawings and the description below. Other features and advantages of the invention will be apparent from the description and drawings, and from the claims.

DETAILED DESCRIPTION

Figure 1:
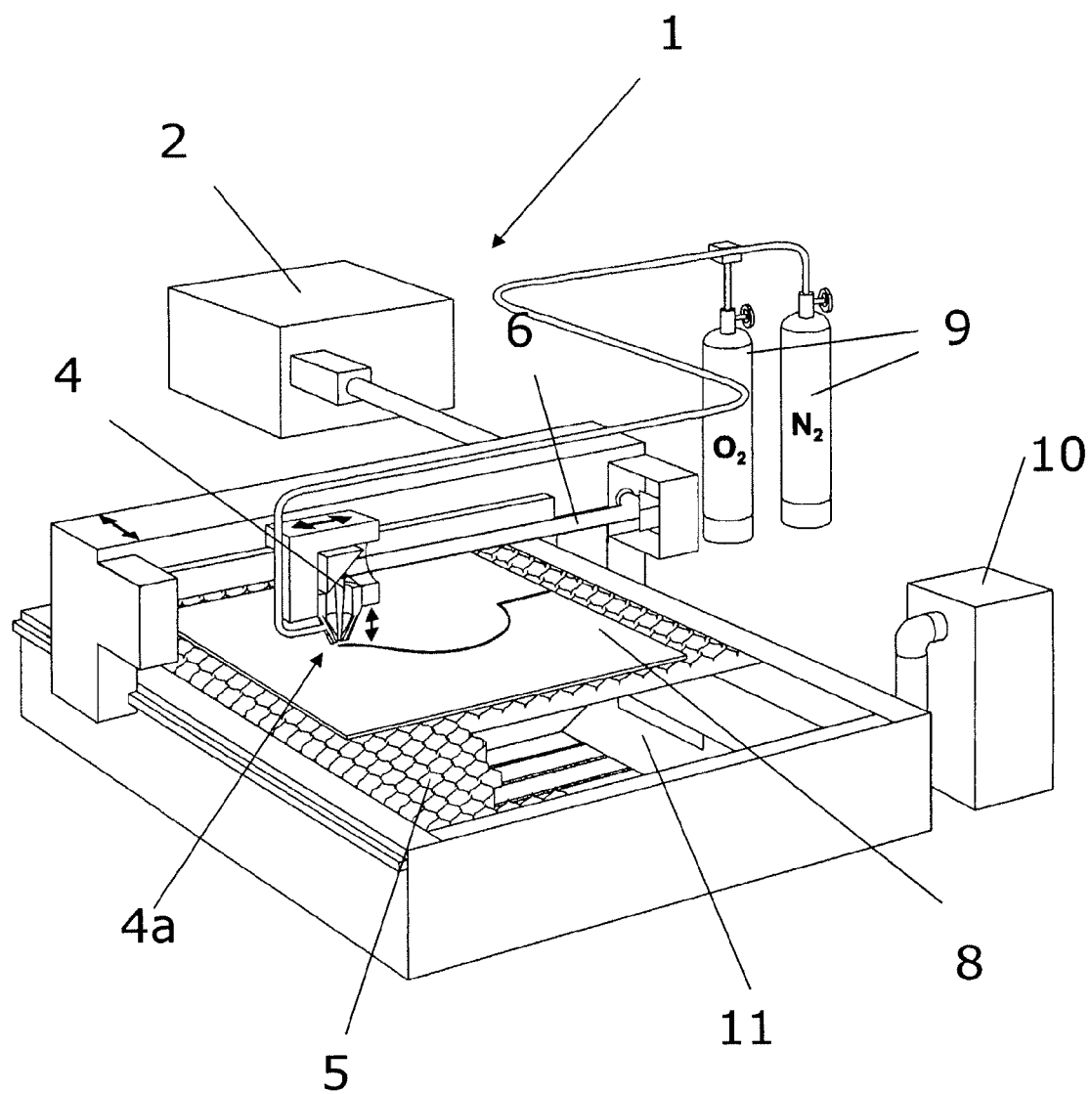
FIG. 1 shows the construction of a laser cutting system.

FIG. 1 shows the construction of a laser machining system 1 for laser cutting, having a $CO_2$ laser 2, a laser machining head 4 (laser machining nozzle 4a) and a workpiece support 5. A generated laser beam 6 is guided with the aid of deflecting mirrors to the laser machining head 4 and with the aid of mirrors is directed onto a workpiece 8.

Before a continuous kerf is formed, the laser beam 6 must pierce the workpiece 8. The metal sheet 8 must undergo punctiform fusion or oxidation at one place, and the molten material must be blown out.

Both piercing and laser cutting are assisted by adding a gas. Oxygen, nitrogen, compressed air and/or application-specific gases may be used as cutting gases 9. The gas ultimately used is dependent on what materials are being cut and what standards of quality are being demanded of the workpiece.

Particles and gases that are produced can be extracted from a suction chamber 11 with the aid of a suction mechanism 10.

Figure 2:
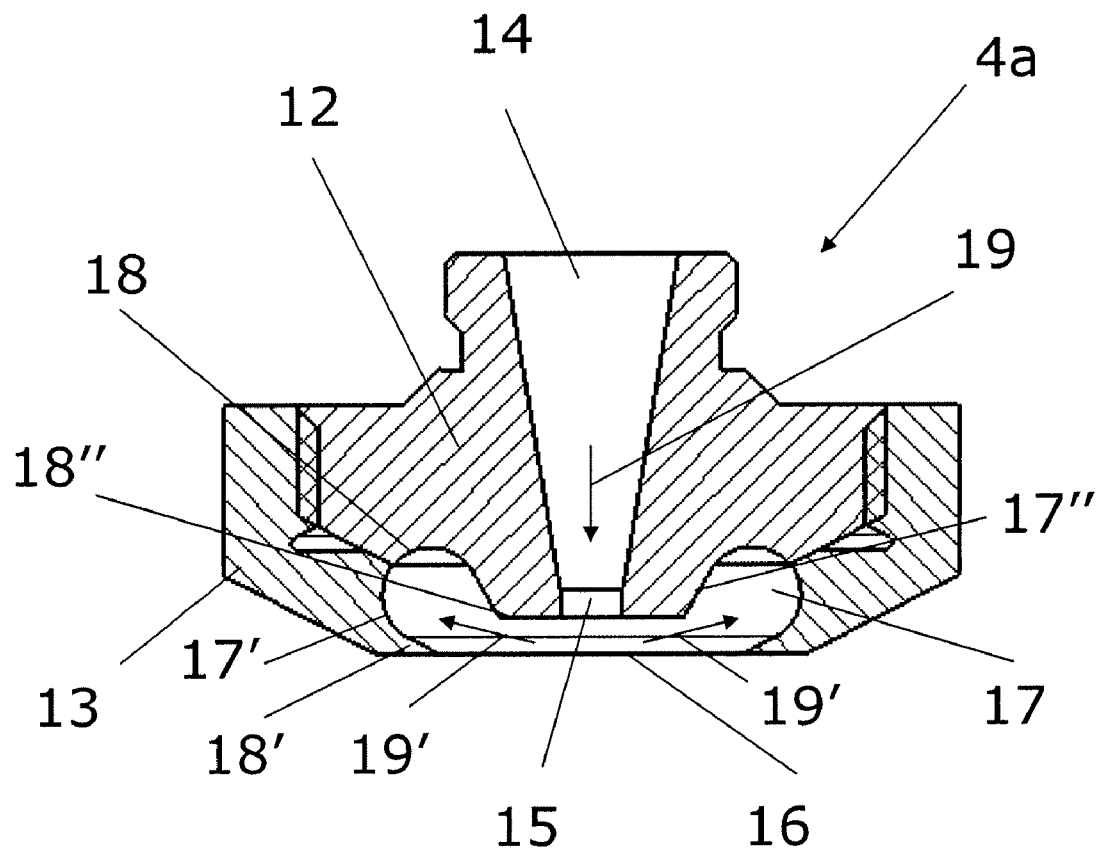
FIG. 2 shows a first laser machining nozzle in longitudinal section.

According to FIG. 2, the laser machining nozzle 4a is constructed from two interconnected components 12 and 13. The laser machining nozzle 4a in the form of a hole-type nozzle has a central supply chamber 14 for the cutting gas and the laser beam.

A cylindrical orifice 15 of the hole-type nozzle 4a is recessed behind a nozzle tip 16, viewed in the direction of flow. An annularly extending cavity 17 for receiving cutting gas is provided rotationally symmetrically with respect to the orifice 15. The cavity 17 is open only towards the underside of the laser machining nozzle 4a, i.e., towards the workpiece and towards the orifice 15. In other words, the cavity has no other openings aside from the nozzle opening at nozzle tip 16 and the orifice 15 which opens into the cavity. The cavity 17 has a rounded base 18, i.e., the base 18 has a curved surface. The cavity 17 is shaped so that the dynamic pressure volume available for the cutting gas extends radially and also behind the nozzle orifice 15. Arrows (main gas jet 19 and backed-up gas jet 19') indicate in FIG. 2 the flow of the cutting gas. At the nozzle tip 16, the laser machining nozzle 4a has a diameter that is many times larger than that of the orifice 15.

The dynamic pressure volume additionally provided with the aid of the cavity 17 is so arranged and formed that parts of the radially exiting gas are returned via a "swirling flow" and envelop the cutting gas jet. The closer the nozzle tip 16 is to the metal sheet to be machined, the higher the flow resistance becomes and the more effectively can the dynamic pressure profile be radially expanded. The edge 18' tapering in a wedge shape on the underside of the laser machining nozzle 4a is primarily responsible for the development of the swirling flow. Radially exiting processing gas is diverted from here partly into the cavity 17 and flows along the inner surfaces 17' and 17" of the cavity 17 over the discharge edge 18" back to the main gas jet 19. The wedge-shaped geometry on the one hand causes the turbulent separation of the radially exiting processing gas and on the other hand acts as conductance geometry for formation of the swirling flow. In addition to the edge 18', the shape of the cavity 17 and the extent of the cavity 17 behind the nozzle orifice 15 are relevant to the formation of the swirling flow.

So that the swirling flow occurs, the cutting distance, that is to say, the distance between the lower edge of the nozzle tip 16 and the surface of the metal sheet, must also be selected to be comparatively small (<0.7 mm, the best cutting distance being from 0.3 to 0.5 mm). If the cutting distance is larger, a pressure cushion develops on the sheet surface, which prevents an effective transfer of momentum of the processing gas. Also, the swirling flow does not develop.

This swirling flow results in a higher overlap degree of the cutting front, which has a positive effect on the following parameters (as compared to a nozzle that is otherwise similar but does not include the chamber 17):

quality (fusion cut instead of plasma cut in the heavy plate range, uniform groove structure);
  feed (+10 to +20%, in individual cases +80 to +100%);
  plasma threshold (fusion cut in the heavy plate range);
  gas consumption.

For the same orifice diameter, the cutting gas consumption lies below current standard values. Initial trials show that in addition cutting can be carried out with smaller orifice diameters, so that cutting gas consumption can be further reduced.

For a satisfactory function of the laser machining nozzle 4a, the inside of the cavity 17 adjoining the nozzle opening may be outwardly inclined. Depending on the angle of inclination, that is to say the angle between the inside 17' and the workpiece, deflection of the radially exiting gas is effected with fewer losses the larger the inclination, that is to say, the acuter the angle of inclination, is. For the best possible formation of the swirling flow, it is necessary to recess the retaining volume behind the plane of the orifice region, e.g., so that the base 18 extends above the plane of the orifice as shown. The geometry in the region of the base 18 and the adjoining flanks 18' may be circular or elliptical.

Figure 3A:
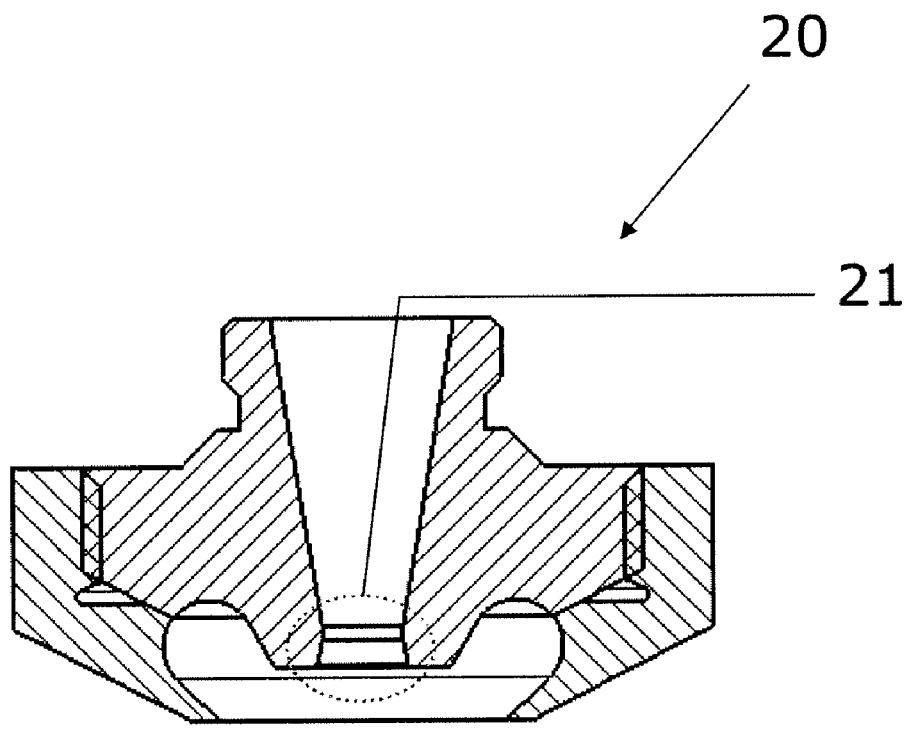
FIG. 3a, 3b show further laser machining nozzles.
Figure 3B:
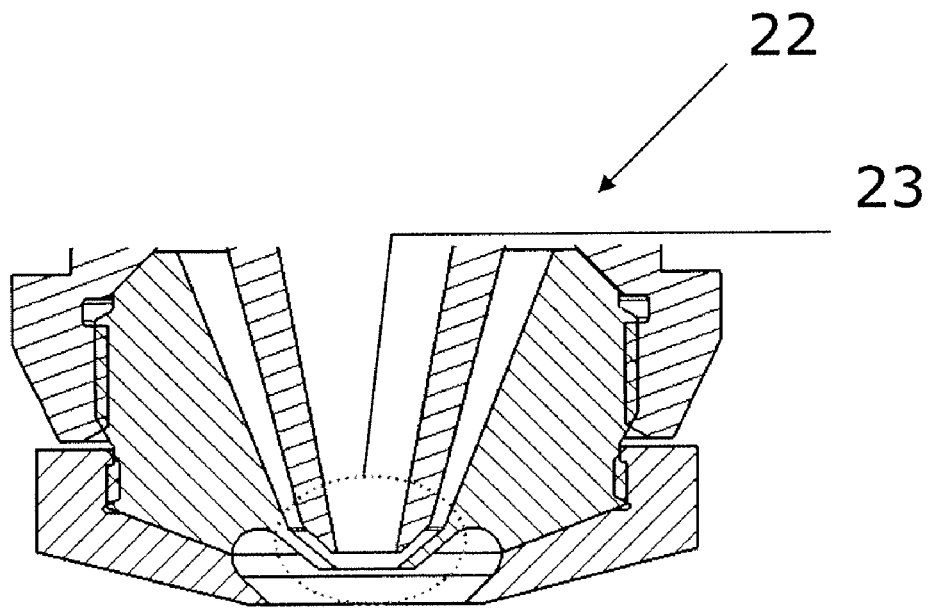

FIGS. 3a and 3b show alternatives to the hole-type orifice used in nozzle 4a shown in FIG. 1. As shown in FIG. 3a, a laser machining nozzle 20 has a conical orifice 21 (Laval nozzle). As illustrated in FIG. 3b, a laser machining nozzle 22 has an annular gap 23. These alternative embodiments are combined with a dynamic pressure volume that is unchanged with respect to the laser machining nozzle 4a according to FIG. 1. The mode of operation according of the invention is therefore maintained.

Figure 4A:
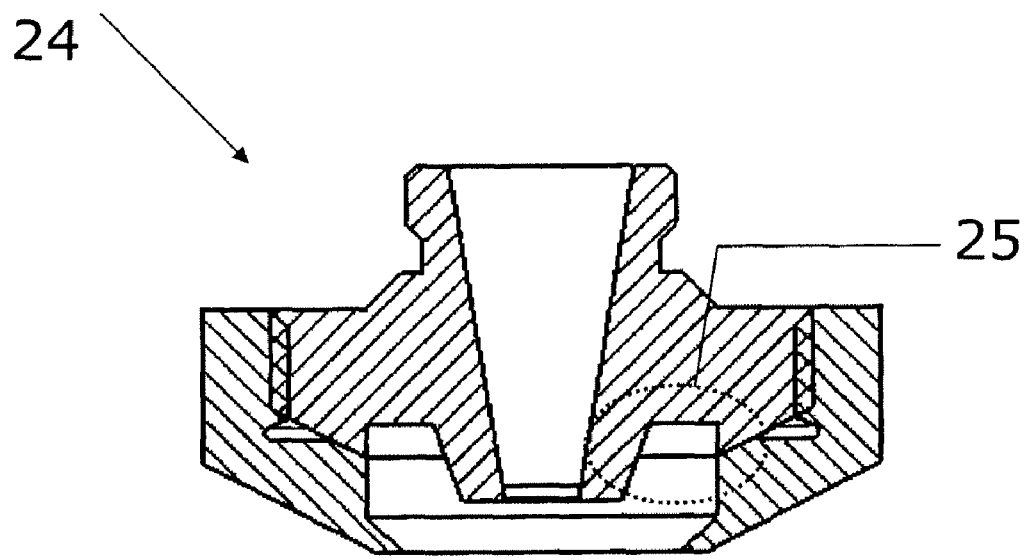
FIGS. 4a, 4b show further laser machining nozzles.
Figure 4B:
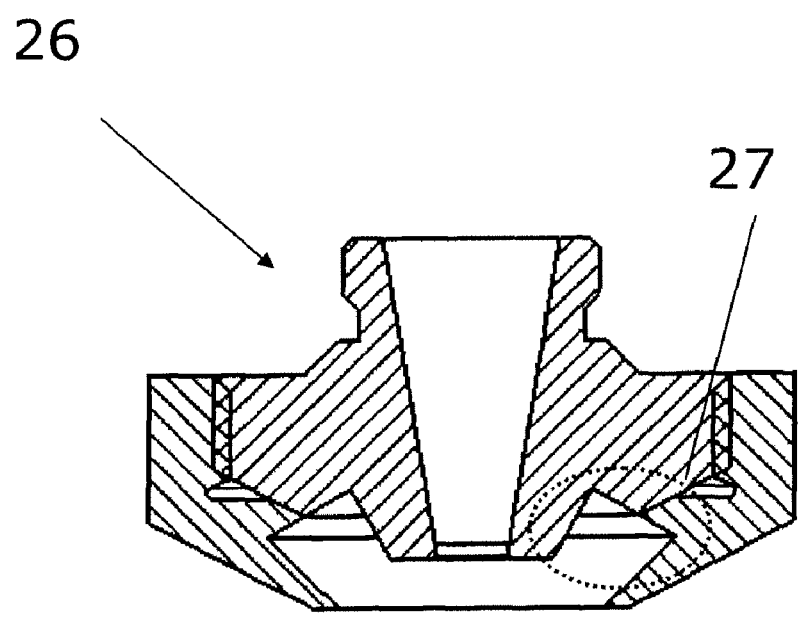

FIGS. 4a and 4b show alternatives to the dynamic pressure volume of the laser machining nozzle 4a shown in FIG. 1. As shown in FIGS. 4a and 4b, apart from round geometries, also angular geometries of the cavity are possible in the laser machining nozzles 24 (cavity 25) and 26 (cavity 27).

A number of embodiments of the invention have been described. Nevertheless, it will be understood that various modifications may be made without departing from the spirit and scope of the invention. Accordingly, other embodiments are within the scope of the following claims.

What is claimed is:

1. A laser machining nozzle comprising:
  a body defining
    a nozzle tip;
    at least one gas supply chamber for a laser beam and a processing gas, wherein the supply chamber terminates at an orifice; and
    a cavity arranged within the body in the region of the orifice of the gas supply chamber, the cavity having a nozzle tip opening that is spaced from the orifice in a direction towards a workpiece to be machined such that the orifice is recessed within the cavity behind the nozzle tip, the nozzle tip opening having a wedge-shaped edge and the cavity having no further openings apart from the nozzle tip opening and the orifice,
  wherein the cavity has a rounded inner contour that extends behind the orifice in a direction away from the workpiece, and
  wherein the orifice, the wedge-shaped edge of the nozzle tip opening, and the rounded inner contour of the cavity are arranged so that portions of processing gas exiting the orifice are returned within the cavity via a swirling flow to envelop the processing gas existing the orifice.

2. A laser machining nozzle according to claim 1, wherein the cavity is arranged rotationally symmetrically with respect to the orifice of the gas supply chamber.

3. A laser machining nozzle according to claim 1, wherein the cavity includes surfaces that are arranged transversely with respect to the direction of the gas supply chamber.

4. A laser machining nozzle according to claim 1, wherein the cavity includes a base, and the base is spaced further from the nozzle opening than the orifice, in the same direction, relative to a workpiece to be machined.

5. A laser machining nozzle according to claim 1, wherein the nozzle tip opening of the cavity has a discharge edge.

6. A laser machining nozzle of claim 5, wherein an inner surface of the discharge edge is inclined from the horizontal.

7. A laser machining system comprising:
  a laser,
  a laser machining head to which a laser beam is guided from the laser;

a workpiece support positioned beneath the laser machining head;

a supply of processing gas; and a laser machining nozzle comprising:

a body defining at least one gas supply chamber through which the laser beam and the processing gas are delivered to the workpiece, the supply chamber terminating at an orifice, and the body further defining a nozzle tip; and a cavity arranged within the body in the region of the orifice of the gas supply chamber, the cavity having a nozzle tip opening that is spaced from the orifice in a direction towards a workpiece to be machined such that the orifice is recessed within the cavity behind the nozzle tip, the nozzle tip opening having a wedge-shaped edge and the cavity having no further openings apart from the nozzle tip opening and the orifice, wherein the cavity has a rounded inner contour that extends behind the orifice in a direction away from the workpiece, and wherein the orifice, the wedge-shaped edge of the nozzle tip opening, and the rounded inner contour of the cavity are arranged so that portions of processing gas exiting the orifice are returned within the cavity via a swirling flow to envelop the processing gas existing the orifice.

8. A laser machining system according to claim 7, wherein the cavity is arranged rotationally symmetrically with respect to the orifice of the gas supply chamber.

9. A laser machining system according to claim 7, wherein the cavity includes surfaces that are arranged transversely with respect to the direction of the gas supply chamber.

10. A laser machining system according to claim 7, wherein the cavity includes a base, and the base is spaced further from the nozzle opening than the orifice, in the same direction, relative to a workpiece to be machined.

11. A laser machining system according to claim 7, wherein the nozzle tip opening of the cavity has a discharge edge.

12. A laser machining system of claim 11, wherein an inner surface of the discharge edge is inclined from the horizontal.

13. A method of laser machining, the method comprising:

positioning a workpiece to be machined on a workpiece support, causing a laser beam to be guided from a laser to a laser machining head positioned above the workpiece;

delivering the laser beam and a processing gas to the workpiece through a laser machining nozzle comprising:

a body defining at least one gas supply chamber through which the laser beam and the processing gas are delivered to the workpiece, the supply chamber terminating at an orifice, and the body further defining a nozzle tip; and a cavity arranged within the body in the region of the orifice of the gas supply chamber, the cavity having a nozzle tip opening that is spaced from the orifice in a direction towards the workpiece to be machined such that the orifice is recessed within the cavity behind the nozzle tip, the nozzle tip opening having a wedge-shaped edge and the cavity having no further openings apart from the nozzle tip opening and the orifice, wherein the cavity has a rounded inner contour that extends behind the orifice in a direction away from the workpiece, and wherein the orifice, the wedge-shaped edge of the nozzle tip opening, and the rounded inner contour of the cavity are arranged so that portions of processing gas exiting the orifice are returned within the cavity via a swirling flow to envelop the processing gas existing the orifice.

14. The method of claim 13, further comprising positioning a lower edge of the laser machining nozzle less than 0.7 mm from the workpiece.

\* \* \* \* \*

UNITED STATES PATENT AND TRADEMARK OFFICE
CERTIFICATE OF CORRECTION

| | | |
|---|---|---|
| PATENT NO. | : 8,188,403 B2 | Page 1 of 1 |
| APPLICATION NO. | : 12/125384 | |
| DATED | : May 29, 2012 | |
| INVENTOR(S) | : Nicolai Speker | |

It is certified that error appears in the above-identified patent and that said Letters Patent is hereby corrected as shown below:

Column 1, line 9, delete "2005" and insert --2005.--.

Column 4, line 49 (Claim 1, line 22) after "gas" delete "existing" and insert --exiting--.

Column 5, line 26 (Claim 7, line 29) after "gas" delete "existing" and insert --exiting--.

Column 6, line 33 (Claim 13, line 28) after "gas" delete "existing" and insert --exiting--.

Signed and Sealed this
Seventh Day of August, 2012

David J. Kappos
*Director of the United States Patent and Trademark Office*